United States Patent
Delia et al.

(10) Patent No.: US 8,130,273 B2
(45) Date of Patent: Mar. 6, 2012

(54) SYSTEM AND METHOD FOR SPOTLIGHT IDENTIFICATION OF AUDIENCE MEMBERS DURING QUESTION AND ANSWER SESSIONS

(75) Inventors: Wayne M. Delia, Poughkeepsie, NY (US); Antonio O. Encarnacion, Jr., Cary, NC (US); Paul M. Musumarra, Cary, NC (US); Mark S. Tillery, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 12/019,732

(22) Filed: Jan. 25, 2008

(65) Prior Publication Data

US 2009/0189977 A1   Jul. 30, 2009

(51) Int. Cl.
*H04N 5/225* (2006.01)
(52) U.S. Cl. ........... 348/169; 348/208; 348/209; 348/14
(58) Field of Classification Search ............ 348/169, 348/208.14
See application file for complete search history.

(56) References Cited

U.S. PATENT DOCUMENTS

| | | | |
|---|---|---|---|
| 5,273,437 A | 12/1993 | Caldwell et al. | |
| 5,365,266 A | 11/1994 | Carpenter | |
| 5,822,525 A | 10/1998 | Tafoya et al. | |
| 7,466,844 B2 * | 12/2008 | Ramaswamy et al. | 382/103 |
| 7,929,011 B2 * | 4/2011 | Elbaze et al. | 348/14.09 |
| 2007/0266395 A1 * | 11/2007 | Lee et al. | 725/11 |

* cited by examiner

*Primary Examiner* — Djenane Bayard
(74) *Attorney, Agent, or Firm* — Cantor Colburn LLP

(57) ABSTRACT

A system for identifying audience members and sequencing audience participation, the system includes: a computing device with logic and storage devices electrically connected audience member control panels, audience identification devices, and a moderator or speaker user interface; wherein the audience control panels are configured for individual audience members to make requests; wherein the computing device: receives the audience member requests and position identifiers and places them in a sequential list in the order received; records position identifiers for the audience members in the sequential list; sends the sequential list to the moderator or speaker; retrieves audience member seat coordinates in response to the recorded position identifiers; calculates actuation commands to control the audience identification devices; actuates the audience identification devices to highlight or focus on an audience member; and activates a microphone located in the vicinity of the recognized audience member, while disabling additional audience member microphones.

20 Claims, 3 Drawing Sheets

SYSTEM AND METHOD FOR SPOTLIGHT IDENTIFICATION OF AUDIENCE MEMBERS DURING QUESTION AND ANSWER SESSIONS

BACKGROUND OF THE INVENTION

1. Field of the Invention

This invention relates generally to audience participation and identification devices, and more particularly to a system, article, and method for providing one or more positional spotlights to identify and sequence audience participation during question and answer sessions.

2. Description of the Related Art

It is common practice to follow speaking presentations to medium to large audiences with a period of time reserved for a question and answer session. Quite often, during the presentation itself, the house lights are dimmed so that attention is focused on the speaker or presentation materials. During the question and answer session however, the house lights must be turned on so that the speaker or facilitator is able to identify and select audience members to ask their questions. Audience members who are not initially selected must either keep their hands in the air, or risk losing priority in the arbitrary sequence of questions asked. If a wired or wireless microphone is available, a facilitator must physically hand-deliver the wireless microphone to the audience member's general location. Otherwise, if a microphone is not available, the speaker must repeat the question asked for the benefit of other audience members who may not have heard the current question. In addition, audience members who interrupt or proceed with a question without raising their hands occasionally disrupt the sequential flow of questions.

SUMMARY OF THE INVENTION

Embodiments of the present invention include a system, method, and article for identifying audience members and sequencing audience participation, the system includes: a computing device with logic and storage devices electrically connected to one or more audience member control panels, one or more audience identification devices, and a moderator or speaker user interface; wherein the one or more audience control panels are configured for individual audience members to make requests; wherein the computing device: receives the audience member requests and places the audience member requests in a sequential list in the order that the audience member requests were received; records position identifiers for the audience members in the sequential list; sends the sequential list to the moderator or speaker; retrieves audience member seat coordinates in response to the recorded position identifiers; calculates actuation commands to control the one or more audience identification devices; actuates the one or more audience identification devices to highlight or focus on an audience member in response to recognition of the audience member by the moderator or speaker; activates a microphone located in the vicinity of the recognized audience member, while disabling additional audience member microphones; wherein the sequential list and audience member seat coordinates are stored in a database contained in the storage devices; wherein the calculation of actuation commands is carried out with trigonometric algorithms and functions utilizing the audience member seat coordinates in relation to the one or more audience identification devices; and wherein the moderator or speaker recognizes audience members from the sequential list displayed on a laptop, workstation, or some other user interface device.

A method for identifying audience members and sequencing audience participation, the method includes: receiving audience requests; recording the order of received audience requests in a sequential list; recording position identifiers for the audience members in the sequential list; sending the sequential list to a moderator or speaker; retrieving audience member seat coordinates in response to the recorded position identifiers; calculating actuation commands to control one or more audience identification devices; actuating the one or more audience identification devices to highlight or focus on an audience member in response to recognition of the audience member by the moderator or speaker.

An article comprising one or more computer-readable storage media containing instructions that when executed by a computer enables identifying audience members and sequencing audience participation; wherein the method further includes: receiving audience requests; recording the order of received audience requests in a sequential list; recording position identifiers for the audience members in the sequential list; sending the sequential list to a moderator or speaker; retrieving audience member seat coordinates in response to the recorded position identifiers; calculating actuation commands to control one or more audience identification devices; actuating the one or more audience identification devices to highlight or focus on an audience member in response to recognition of the audience member by the moderator or speaker.

TECHNICAL EFFECTS

As a result of the summarized invention, a solution is technically achieved for a method, article, and system for providing one or more positional spotlights to identify and sequence audience participation during question and answer sessions.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
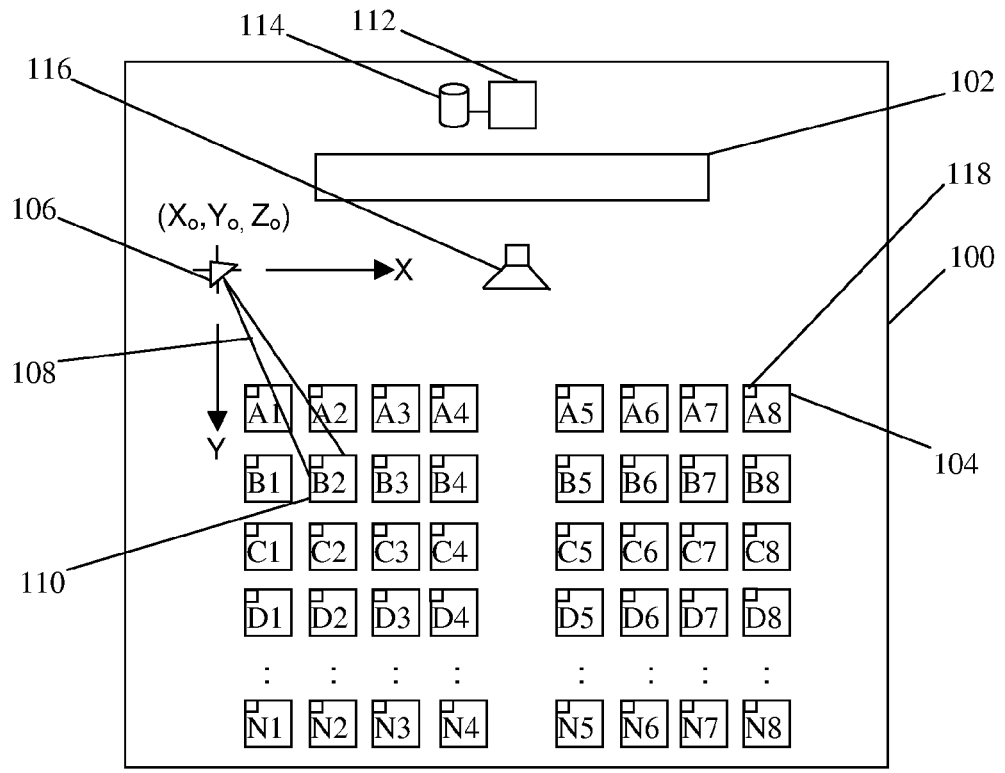
FIG. 1 is a top down view of an auditorium for illustrating the positional identification of audience members according to embodiments of the invention.

The detailed description explains the preferred embodiments of the invention, together with advantages and features, by way of example with reference to the drawings.

DETAILED DESCRIPTION

Embodiments of the invention provide a method, article and system for providing one or more positional spotlights to identify and sequence audience participation during question and answer sessions.

Embodiments of the system of the invention provide one or more narrow-beam focused spotlights that may be repositioned in response to computer control signals to indicate a sequence of audience members who wish to participate in question and answer sessions at the end of presentations. The computer signals are generated utilizing trigonometric algorithms and relationships to calculate positional offsets. The positional offsets are applied to the current position of the spotlight(s), beginning with a known starting default position of the spotlight(s), using a vertical angle adjustment and a horizontal angle adjustment to move and position the one or more spotlights to focus on the next audience participant in the sequence. Inputs to the trigonometric algorithm are drawn from seat location field values stored in a small-footprint database in the application system.

Audience members utilize embodiments of the invention to indicate their desire to ask a question by pressing an indicator control at their seat location. The sequence of audience member participation in the question and answer session is determined by the chronological order in which the seat-side indicators have been pressed. The audience members have access to a wired or wireless microphone, positioned near their seat location, which is activated when an audience member's turn to ask a question occurs. In addition, all other audience seat-side microphones are deactivated, which reduces the possibility of the designated audience member being interrupted. The presenter or lecturer at the podium may manage the queue of audience members waiting to ask questions through the use of a laptop, workstation, or some other user interface device to see how many (if any) audience members are waiting to ask questions. The ability of the presenter or lecturer to identifying the number and proper order of questions to address, aids in the efficient management and pace of answering audience member questions.

In embodiments of the invention, the one or more narrow-beam spotlights may be fixed or mobile and portable, and may dynamically determine where they are in the room in relation to the seating or audience member locations. The narrow-beam spotlights may also be integrated with cameras, which are also pointing at the audience member asking the question. The cameras feed video of the person asking the question to a presentation screen. In an alternative embodiment, the spotlights may work in tandem with separately located and mounted video cameras, which are repositioned using the same trigonometric algorithms and relationships that are used to aim the spotlights. In a further embodiment, the auditorium lights may not be dimmed, and the spotlight may not be used, instead a series of user interfaces at the audience member seats indicates which audience member in the sequence has their turn to speak, while all other audience microphones are deactivated.

FIG. 1 is a top down view of an auditorium 100 for illustrating the positional identification of audience members according to embodiments of the invention. The auditorium 100 is set up for a presentation with a podium, stage, or dais 102 to accommodate one or more speakers or presenters, and a series of rows of seats 104. A control panel of indicators 118 is available at each seat 104, and includes a set of buttons that may be pressed by audience members wishing to ask or retract a question. The control panel of indicators 118 at each seat contains a wireless microphone connected to an audio amplification system 116 in the auditorium. When an audience member indicates a desire to ask a question, a transaction is transmitted to a computer system 112 which records the seat location and sequential order of receiving the request in a database table 114.

Figure 2:
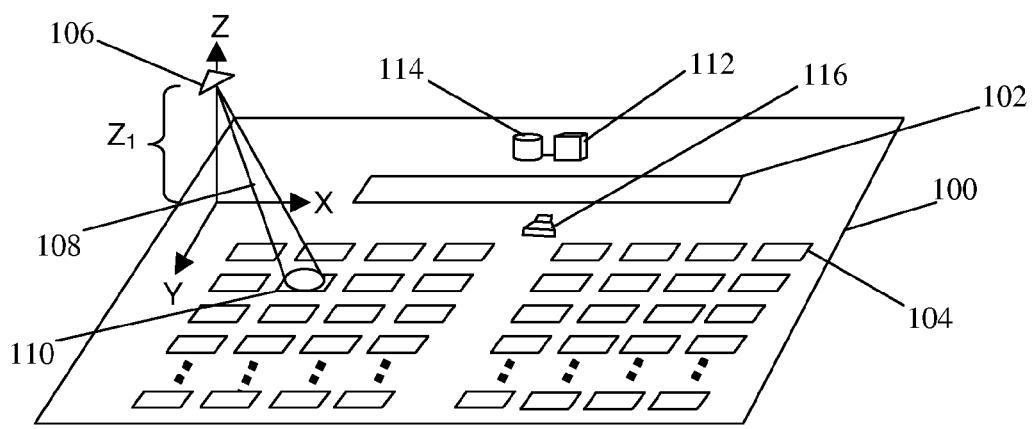
FIG. 2 is an elevation view of an auditorium for illustrating the positional identification of audience members according to embodiments of the invention.

The database table (a small portion of which is illustrated in Table 1 records the positions of each of the seats 104 based on a three dimensional coordinate system with an X and Y axis in a horizontal plane that is parallel to the floor of the auditorium 100, and a Z axis (see FIG. 2) that is perpendicular to the auditorium floor. The coordinates of the seat locations are determined relative to fixed point(s) in the auditorium; usually a set of distances measured from the front and left walls of the auditorium. In the exemplary embodiment of FIGS. 1 and 2 the origin of the three dimensional coordinate system coincides with the spotlight/camera 106. As seen in Table 1, each of the chairs 104 of row A are offset from each other along the X axis, with a lager separation between the chair at location A4 and A5 accounting for the passageway between A4 and A5. The Y coordinate is the same for the entire row A. Similarly, row B has the same X coordinates as row A; however the Y coordinate is shifted relative to row A. In addition, the seats in row B have a Z coordinate other than zero that indicates that row B is higher than row A, thereby implying there is a slope or terraced arrangement of the rows in the auditorium 100. In FIGS. 1 and 2 spotlight 108 is positioned to point at seat location B2 110.

TABLE 1

| Seat | X | Y | Z |
|------|-----|-----|---|
| A1 | 72 | 84 | 0 |
| A2 | 96 | 84 | 0 |
| A3 | 120 | 84 | 0 |
| A4 | 144 | 84 | 0 |
| A5 | 192 | 84 | 0 |
| A6 | 216 | 84 | 0 |
| A7 | 240 | 84 | 0 |
| A8 | 264 | 84 | 0 |
| B1 | 72 | 120 | 3 |
| B2 | 96 | 120 | 3 |
| B3 | 120 | 120 | 3 |

In FIGS. 1 and 2 the computer system 112 is attached to, and controls via application system software, the movable narrow-beam low-wattage spotlight/camera 106 that changes direction/position corresponding to a set of coordinates received from the computer system 112. The computer system 112 may be connected to the one or more spotlight/cameras 106 in a wired or wireless manner. The application system software processes transactions in the order in which they are received, repositioning the spotlight 108 to the seat location of the next person to ask a question, and activates the wireless microphone so that the question can be heard. Optionally, a video camera may be affixed below the movable spotlight 106 so that a video feed of the person asking the question can be included in the multimedia presentation so that the audience can see who is asking the current question. The movable spotlight 106 may be in a fixed position in the auditorium, or may be portable to cover alternative locations as necessary. If the movable spotlight 106 is not in a fixed location, the database 114 on the computer system 112 will be updated to contain the accurate location of the movable spotlight 106 with respect to fixed points in the room relative to unmoving objects, such as the front or left side wall.

Figure 3:
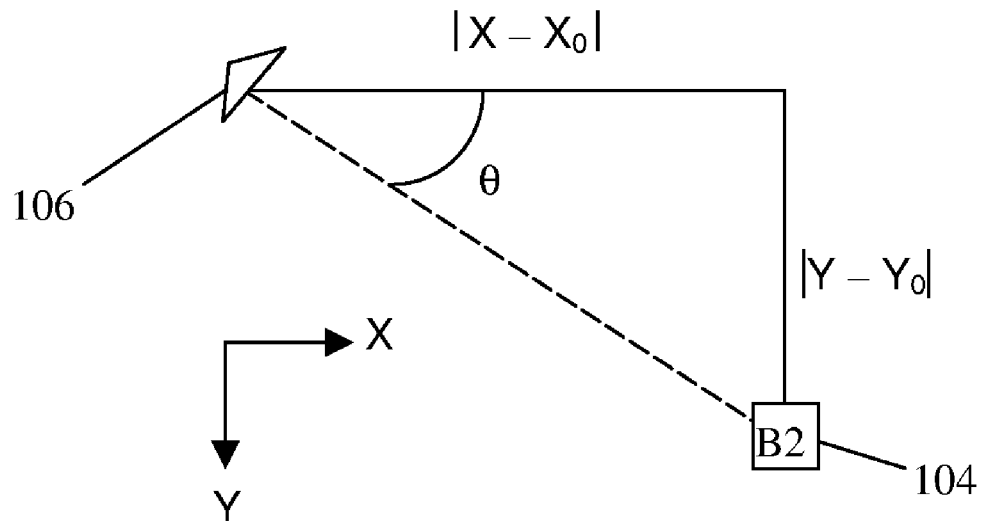
FIG. 3 illustrates the trigonometric relationships for calculating a horizontal adjustment angle theta ($\theta$) for aiming a spotlight or other audience identifiers according to embodiments of the invention.

FIG. 3 illustrates the trigonometric relationships for calculating a horizontal adjustment angle theta ($\theta$) in the X-Y plane for aiming a spotlight or other audience identifiers according to embodiments of the invention. The formula for calculating the horizontal adjustment angle theta ($\theta$) is arctan ($|Y-Y_0|/|X-X_0|$).

Figure 4:
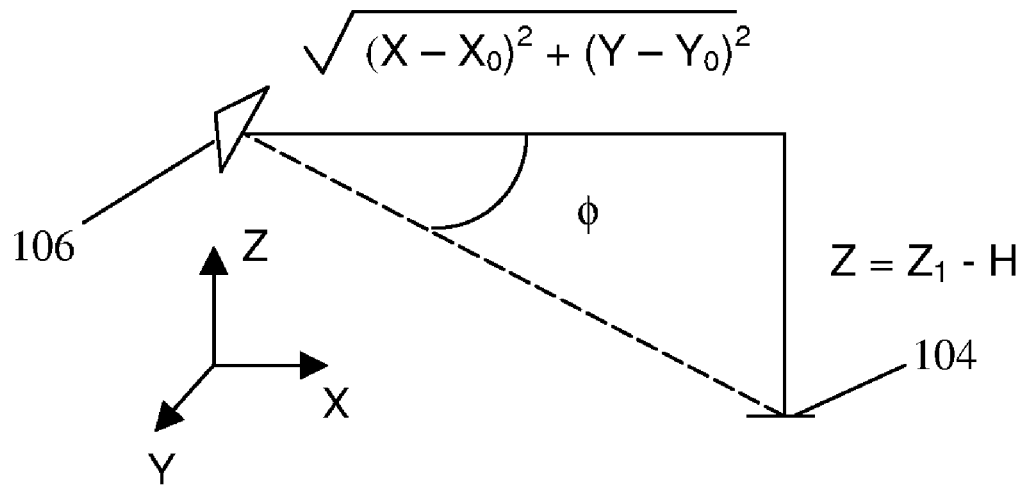
FIG. 4 illustrates the trigonometric relationships for calculating a vertical adjustment angle phi ($\Phi$) for aiming a spotlight or other audience identifiers according to embodiments of the invention.

FIG. 4 illustrates the trigonometric relationships for calculating a vertical adjustment angle phi ($\Phi$) in the Z plane for aiming a spotlight or other audience identifiers according to embodiments of the invention. The formula for calculating the vertical adjustment angle phi ($\Phi$) is arctan $((Z_1-H)/(\sqrt{(|Y-Y_0|^2+|X-X_0|^2)}))$, where H is the height above Z=0, and Z1 is the height of the spotlight. The height H may correspond to a typical audience member height, or to the elevation of a row.

Figure 5:
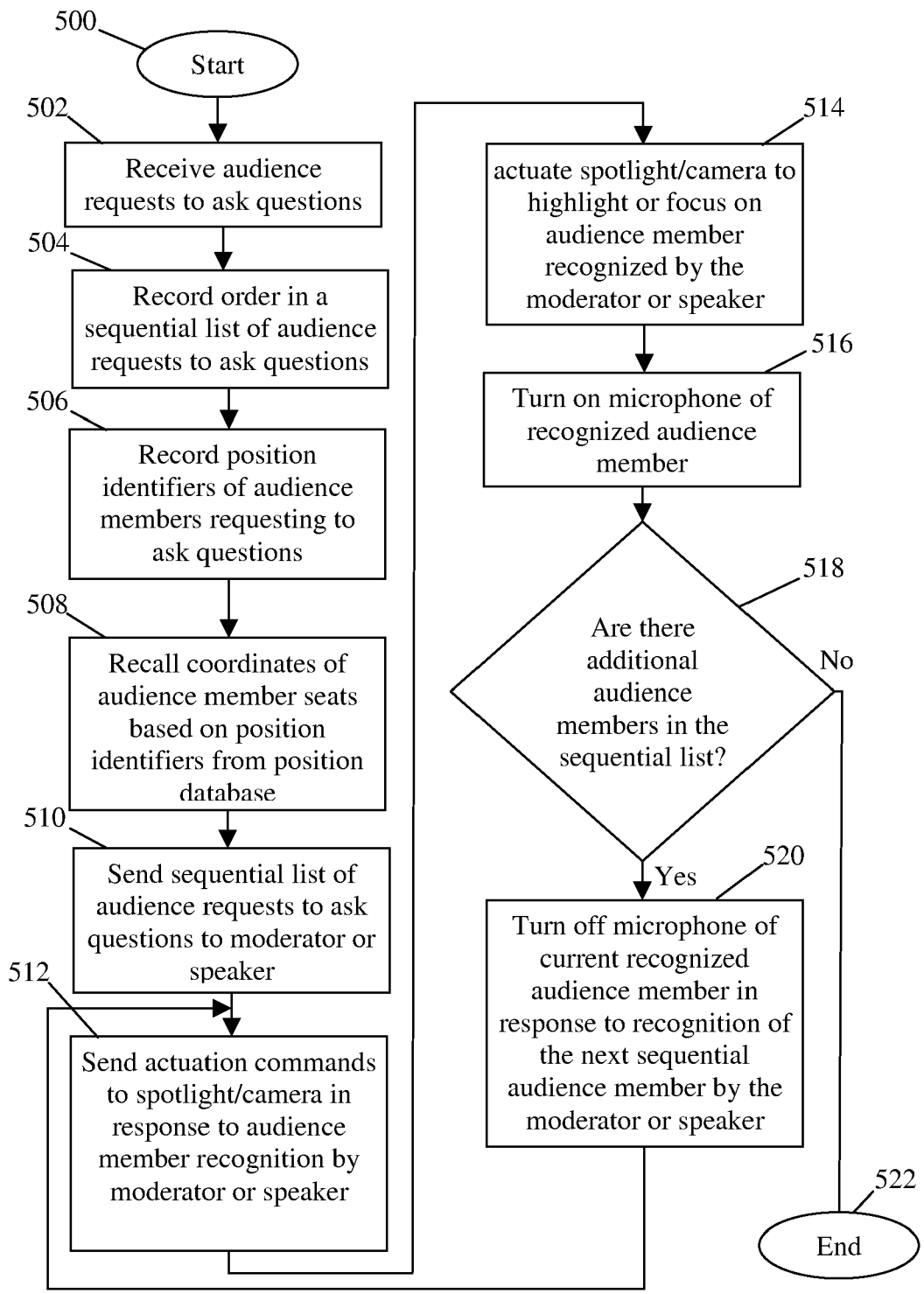
FIG. 5 illustrates a flowchart for implementing embodiments of the invention.

FIG. 5 illustrates a flowchart for implementing embodiments of the invention. The process starts (block 500) with the computer system running the application software receiving audience requests to ask question to the moderator or speaker (block 502). The computer system records the order in which the audience question requests were received in a sequential list (block 504) with their respective position identifiers (block 506). The computer system utilizes the position identifiers to recall coordinates of audience member seats from a position database (block 508). The computer system sends the sequential list of audience requests to answer questions to the moderator or speaker (block 510). The computer system calculates movement commands to actuate one or more spotlight/cameras, based on the coordinates of audience member seat locations, in response to audience member recognition by the moderator or speaker (block 512) that actuates the spotlight/cameras to highlight or focus on the audience member recognized by the moderator or speaker (block 514). The computer system turns on the microphone of the recognized audience member (block 516). If there are no further audience members in the sequential list wishing to ask questions (decision block 518 is No) the process ends (block 522).

However, if there are additional audience members in the sequential list awaiting to ask questions (decision block 518 is Yes) the microphone of the current recognized audience member is turned off in response to the recognition of the next sequential audience member by the moderator or speaker (block 520), and the computer system sends the coordinates of next sequential audience member seat location to one or more spotlight/cameras in response to recognition of the next audience member by the moderator or speaker (block 512), to actuate the spotlight/cameras to highlight or focus on the next audience member recognized by the moderator or speaker (block 514). The computer system turns on the microphone of the recognized audience member (block 516). If there are no further audience members in the sequential list wishing to ask questions (decision block 518 is No) the process ends (block 522). If there are further audience members in the sequential list awaiting their turn to ask a question (decision block 518 is Yes) the process continues until the sequential list is exhausted and the end point is reached (block 522).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for identifying audience members and sequencing audience participation, the system comprising:
    a computing device with logic and storage devices electrically connected to one or more audience member control panels, one or more audience identification devices, and a moderator or speaker user interface;
    wherein the one or more audience control panels are configured for individual audience members to make requests;
    wherein the computing device:
    receives the audience member requests and places the audience member requests in a sequential list in the order that the audience member requests were received;
    records position identifiers for the audience members in the sequential list;
    sends the sequential list to the moderator or speaker;
    retrieves audience member seat coordinates in response to the recorded position identifiers;
    calculates actuation commands to control the one or more audience identification devices;
    actuates the one or more audience identification devices to highlight or focus on an audience member in response to recognition of the audience member by the moderator or speaker;
    activates a microphone located in the vicinity of the recognized audience member, while disabling additional audience member microphones;
    wherein the sequential list and audience member seat coordinates are stored in a database contained in the storage devices;
    wherein the calculation of actuation commands is carried out with trigonometric algorithms and functions utilizing the audience member seat coordinates in relation to the one or more audience identification devices; and
    wherein the moderator or speaker recognizes audience members from the sequential list displayed on a laptop, workstation, or some other user interface device.

2. The system of claim 1, wherein the one or more audience identification devices are spotlights.

3. The system of claim 1, wherein the one or more audience identification devices are cameras.

4. The system of claim 1, wherein the one or more audience identification devices are spotlights integrated with cameras.

5. The system of claim 1, wherein the one or more audience identification devices are a combination of spotlights and cameras; and
    wherein the spotlights and cameras are individually distributed throughout a room or meeting area.

6. A method for identifying audience members and sequencing audience participation, the method comprising:
    receiving audience requests;
    recording the order of received audience requests in a sequential list;
    recording position identifiers for the audience members in the sequential list;
    sending the sequential list to a moderator or speaker;

retrieving audience member seat coordinates in response to the recorded position identifiers;

calculating actuation commands to control one or more audience identification devices; and actuating the one or more audience identification devices to highlight or focus on an audience member in response to recognition of the audience member by the moderator or speaker.

7. The method of claim 6, further comprising:

activating a microphone located in the vicinity of the recognized audience member, while disabling additional audience member microphones.

8. The method of claim 6, wherein the method is carried out by application software configured for identifying and sequencing audience member participation running on a computer system.

9. The method of claim 6, wherein the sequential list and audience member seat coordinates are stored in a database.

10. The method of claim 6, wherein the calculation of actuation commands is carried out with trigonometric algorithms and functions utilizing the audience member seat coordinates in relation to the one or more audience identification devices.

11. The method of claim 6, wherein the one or more audience identification devices are spotlights.

12. The method of claim 6, wherein the one or more audience identification devices are cameras.

13. The method of claim 6, wherein the one or more audience identification devices are spotlights integrated with cameras.

14. The method of claim 6, wherein the one or more audience identification devices are a combination of spotlights and cameras; and wherein the spotlights and cameras are individually distributed throughout a room or meeting area.

15. The method of claim 6, wherein the moderator or speaker recognizes audience members from the sequential list displayed on a laptop, workstation, or some other user interface device.

16. An article comprising one or more non-transitory, tangible computer-readable storage media containing instructions that, when executed by a computer, implements a method of identifying audience members and sequencing audience participation, wherein the method comprises:

receiving audience requests;

recording the order of received audience requests in a sequential list;

recording position identifiers for the audience members in the sequential list;

sending the sequential list to a moderator or speaker;

retrieving audience member seat coordinates in response to the recorded position identifiers;

calculating actuation commands to control one or more audience identification devices; and actuating the one or more audience identification devices to highlight or focus on an audience member in response to recognition of the audience member by the moderator or speaker.

17. The article of claim 16, wherein the method further comprises:

activating a microphone located in the vicinity of the recognized audience member, while disabling additional audience member microphones.

18. The article of claim 16, wherein the sequential list and audience member seat coordinates are stored in a database.

19. The article of claim 16, wherein the calculation of actuation commands is carried out with trigonometric algorithms and functions utilizing the audience member seat coordinates in relation to the one or more audience identification devices.

20. The article of claim 16, wherein the one or more audience identification devices are at least one of spotlights, cameras, or a combination of spotlights and cameras.

* * * * *